US010970784B2

(12) United States Patent
Marshall et al.

(10) Patent No.: US 10,970,784 B2
(45) Date of Patent: Apr. 6, 2021

(54) MULTI-FACTOR INVESTMENT FUND RATING SCORING SYSTEM AND METHOD

(71) Applicant: Spectrum Investment Advisors, Inc., Mequon, WI (US)

(72) Inventors: James F. Marshall, Germantown, WI (US); Jonathan J. Marshall, Milwaukee, WI (US); Manuel Rosado, Mequon, WI (US); Samuel J. Vanden Heuvel, Butler, WI (US); Paul F. Martinez, Fox Point, WI (US)

(73) Assignee: Spectrum Investment Advisors, Inc., Mequon, WI (US)

( * ) Notice: Subject to any disclaimer, the term of this patent is extended or adjusted under 35 U.S.C. 154(b) by 225 days.

(21) Appl. No.: 13/828,004

(22) Filed: Mar. 14, 2013

(65) Prior Publication Data

US 2014/0279679 A1   Sep. 18, 2014

(51) Int. Cl.
*G06Q 40/06* (2012.01)
*G06Q 40/00* (2012.01)

(52) U.S. Cl.
CPC ......... *G06Q 40/06* (2013.01); *G06Q 40/00* (2013.01)

(58) Field of Classification Search
CPC ........ G06Q 40/06; G06Q 40/08; G06Q 40/00
USPC ........................................................ 705/36 R
See application file for complete search history.

(56) References Cited

U.S. PATENT DOCUMENTS

| 7,536,333 | B1 | 5/2009 | Omansky | |
| 7,707,092 | B1 * | 4/2010 | Freed | G06Q 40/06 705/36 R |
| 7,899,728 | B2 * | 3/2011 | Egan | G06Q 40/00 705/35 |
| 8,329,305 | B2 | 8/2012 | Brooks | |
| 8,301,487 | B2 * | 10/2012 | Rapperport | G06Q 10/04 705/7.35 |
| 8,352,347 | B2 * | 1/2013 | Howard | G06Q 40/06 705/35 |
| 8,429,051 | B1 * | 4/2013 | Samson | G06Q 40/06 235/379 |
| 2002/0116310 | A1 | 8/2002 | Cohen et al. | |
| 2002/0120629 | A1 * | 8/2002 | Leonard | G06Q 30/02 |

(Continued)

FOREIGN PATENT DOCUMENTS

| WO | WO-2008147512 A1 * | 12/2008 | ............. G06Q 40/06 |
| WO | WO-2012116309 A2 * | 8/2012 | ............. G06Q 40/06 |

OTHER PUBLICATIONS

Valley Vista Enterprises, LLC: Your complete guide to investing in mutual funds: Mean and Standard Deviation analyzing investment returns, Web Archives Feb. 7, 2010, Wayback Machine, pp. 1-5.*

(Continued)

*Primary Examiner* — Bijendra K Shrestha

(74) *Attorney, Agent, or Firm* — Reinhart Boerner Van Deuren P.C.

(57) ABSTRACT

A system of and method for generating investment fund rating scores using a number of factors including criteria related to risk factors, performance, and qualitative factors. Historical weighting is provided to minimize the effect of short-term fluctuations, and the various factors are also weighted to establish the relative contributions of each of the evaluated factors. The ratings can be used to select, evaluate, and monitor mutual funds.

24 Claims, 6 Drawing Sheets

(56) References Cited

U.S. PATENT DOCUMENTS

| | | | | |
|---|---|---|---|---|
| 2003/0163337 A1* | 8/2003 | Kasten | .................. | G06Q 30/02 |
| | | | | 705/36 R |
| 2006/0074785 A1* | 4/2006 | Festog | .................. | G06Q 40/00 |
| | | | | 705/35 |
| 2006/0136324 A1* | 6/2006 | Barry | .................... | G06Q 30/08 |
| | | | | 705/37 |
| 2007/0168302 A1* | 7/2007 | Giovinazzo | ............ | G06Q 40/00 |
| | | | | 705/36 R |
| 2009/0187633 A1 | 8/2009 | Howard et al. | | |
| 2009/0198633 A1 | 8/2009 | Howard et al. | | |
| 2010/0299281 A1* | 11/2010 | Smith | .................... | G06Q 40/06 |
| | | | | 705/36 R |

OTHER PUBLICATIONS

Farina, Antonio: Chi-Square Test, Web Archives, Feb. 18, 2010, Wayback Machine, pp. 1-3.*

Farina, Antonio: Chi-Square Test, Web Archives, Feb. 18, 2010, Wayback Machine, pp. 1-3. (Year: 2010).*

Valley Vista Enterprises, LLC: Your complete guide to investing in mutual funds: Mean and Standard Deviation analyzing investment returns, Web Archives Feb. 7, 2010, Wayback Machine, pp. 1-5. (Year: 2010).*

Standard & Poors: Funds Ratings Criteria, 2007, pp. 1-79 (Year: 2007).*

* cited by examiner

FIG. 4

| FACTOR TYPE | FACTOR | ANALYSIS TYPE | 10-YEAR ANALYSIS WEIGHT | 5-YEAR ANALYSIS WEIGHT | 3-YEAR ANALYSIS WEIGHT | WEIGHT |
|---|---|---|---|---|---|---|
| RISK FACTORS | STANDARD DEVIATION | NORMAL DISTRIBUTION | 3-YEAR - 30%<br>5-YEAR - 30%<br>10-YEAR - 40% | 3-YEAR - 40%<br>5-YEAR - 60% | 3-YEAR - 100% | 16.7% |
| RISK FACTORS | BETA | NORMAL DISTRIBUTION | 3-YEAR - 30%<br>5-YEAR - 30%<br>10-YEAR - 40% | 3-YEAR - 40%<br>5-YEAR - 60% | 3-YEAR - 100% | 16.7% |
| RISK FACTORS | UP LESS DOWN CAPTURE | NORMAL DISTRIBUTION | 3-YEAR - 30%<br>5-YEAR - 30%<br>10-YEAR - 40% | 3-YEAR - 40%<br>5-YEAR - 60% | 3-YEAR - 100% | 16.7% |
| PERFORMANCE | TOTAL RETURN | NORMAL DISTRIBUTION | 3-YEAR - 30%<br>5-YEAR - 30%<br>10-YEAR - 40% | 3-YEAR - 40%<br>5-YEAR - 60% | 3-YEAR - 100% | 30% |
| QUALITATIVE FACTORS | INFORMATION RATIO | NORMAL DISTRIBUTION | 3-YEAR - 30%<br>5-YEAR - 30%<br>10-YEAR - 40% | 3-YEAR - 40%<br>5-YEAR - 60% | 3-YEAR - 100% | 4% |
| QUALITATIVE FACTORS | R-SQUARED | NORMAL DISTRIBUTION | 3-YEAR - 30%<br>5-YEAR - 30%<br>10-YEAR - 40% | 3-YEAR - 40%<br>5-YEAR - 60% | 3-YEAR - 100% | 4% |
| QUALITATIVE FACTORS | ALPHA | NORMAL DISTRIBUTION | 3-YEAR - 30%<br>5-YEAR - 30%<br>10-YEAR - 40% | 3-YEAR - 40%<br>5-YEAR - 60% | 3-YEAR - 100% | 4% |
| QUALITATIVE FACTORS | MANAGER TENURE | CHI-SQUARED DISTRIBUTION | N/A | N/A | N/A | 4% |
| QUALITATIVE FACTORS | NET EXPENSE RATIO | CHI-SQUARED DISTRIBUTION | N/A | N/A | N/A | 4% |
| SIRPP SCORE | TOTAL | | | | | 100% |

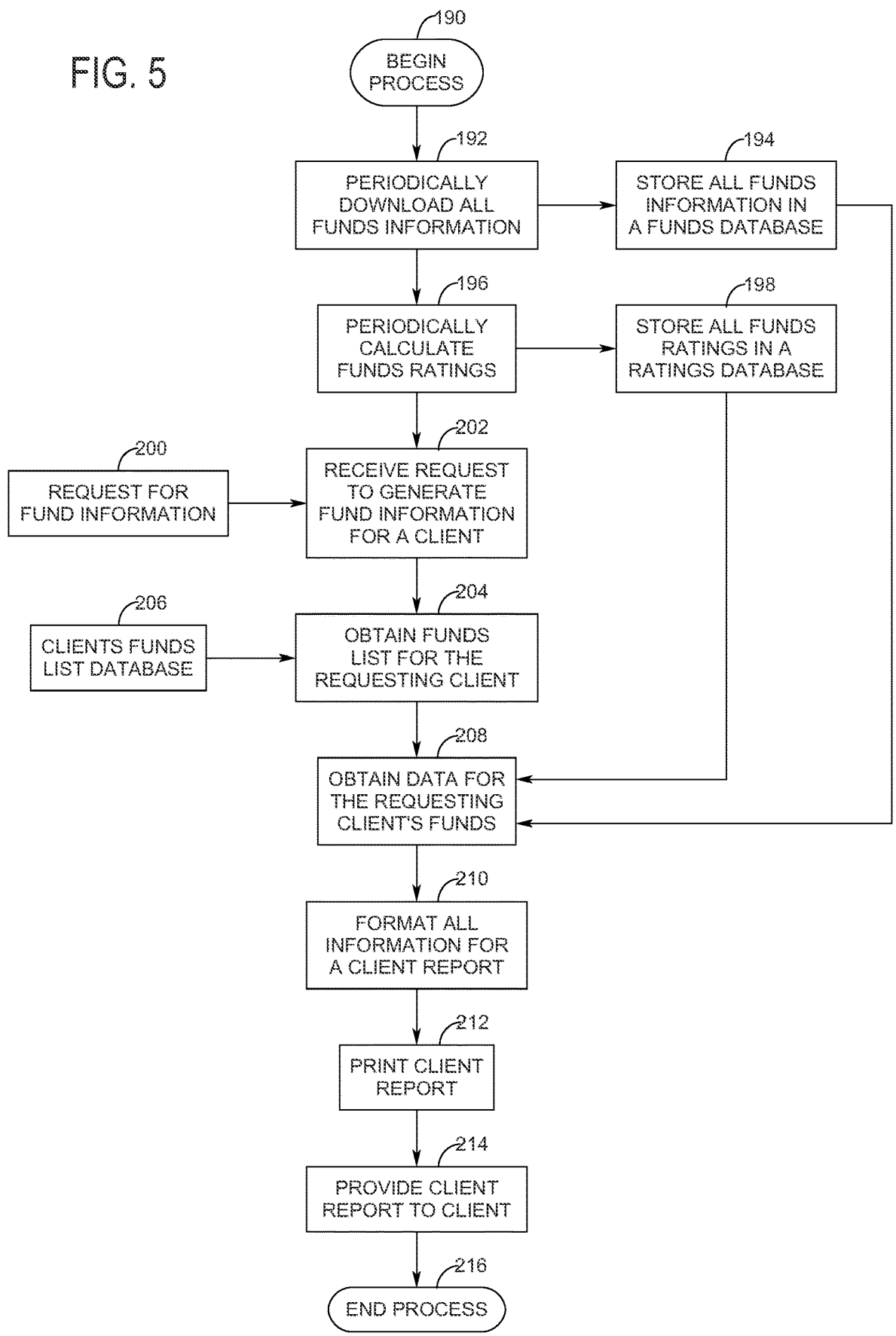

Fig. 6

| Fund Name | Historical Performance 6/30/2012 | | | | | # of Funds @ 5 years | Category Rank % 1=Best 100=Worst | | | Spectrum SIRRF Score | Beta | Net Expense Ratio* | Comments/Manager | Tenure (Yrs.)** |
|---|---|---|---|---|---|---|---|---|---|---|---|---|---|---|
| | 1 Year Return | 3 Year Return | 5 Year Return | 10 Year Return | Since Inception | | 3 Yr. | 5 Yr. | 10 Yr. | | | | | |
| Wells Fargo Stable Return *90 Day U.S. Treasury Bill* | 1.70% *0.05%* | 2.19% *0.10%* | 2.87% *0.74%* | 3.52% *1.74%* | 5.61% | NR | NR | NR | NR | | 0.00 *0.00* | 0.73% *0.00%* | Stable $1.00 Share Price | 0.0 |
| PIMCO Total Return A (PTTAX) *Average Intermediate-Term Bond* | 6.54% *6.57%* | 8.23% *8.31%* | 8.75% *6.20%* | 6.50% *5.20%* | 6.97% | 880 | 49 | 4 | 12 | 8 | 0.83 *0.86* | 0.85% *0.93%* | William H. Gross | 25.2 |
| Vanguard Inflation Protected Securities (VIPSX) *Average Inflation-Protected Bond* | 11.76% *9.63%* | 9.48% *8.91%* | 8.10% *7.13%* | 6.98% *6.55%* | 7.59% | 146 | 26 | 28 | 45 | 28 | 1.18 *1.08* | 0.20% *0.83%* | Management Team | 0.9 |
| Templeton Global Bond Adv (TGBAX) *Average World Bond* | -0.86% *2.23%* | 8.91% *7.08%* | 9.41% *6.40%* | 11.00% *6.43%* | 8.27% | 178 | 26 | 6 | 1 | 1 | -0.20 *0.98* | 0.64% *1.13%* | Management Team | 11.5 |
| T. Rowe Price Capital Appreciation (PRWCX) | 4.34% *0.50%* | 13.64% *13.82%* | 3.49% *-2.11%* | 8.25% *4.68%* | 11.07% | 673 | 10 | 8 | 2 | 11 | 1.04 *1.02* | 0.72% *1.23%* | David R. Giroux | 6.1 |
| Calamos Equity & Income I (CIIKX) | -1.04% | 9.87% | 3.75% | 7.44% | 10.52% | 673 | 80 | 6 | 3 | 6 | 1.04 | 0.77% | Clyde S. McGregor | 16.7 |
| Janus Balanced T (JABAX) *Average Moderate Allocation* | 2.04% *0.92%* | 10.13% *11.31%* | 4.89% *1.38%* | 6.72% *5.24%* | 9.65% | 673 | 7 | 2 | 10 | 5 | 1.02 *1.04* | 0.84% *1.31%* | Management Team | 7.2 |
| JPMorgan Equity Income Select (HLIEX) *Average Large Cap Value* | 7.48% *0.50%* | 18.68% *13.82%* | 1.62% *-2.11%* | 6.07% *4.68%* | 8.28% | 935 | 3 | 6 | 12 | 3 | 0.85 *1.02* | 0.80% *1.23%* | Management Team | 7.9 |
| T. Rowe Price Mid Cap Value (TRMCX) *Average Mid-Cap Value* | -2.91% *-3.42%* | 15.42% *16.68%* | 0.93% *-0.64%* | 8.47% *6.76%* | 10.66% | 296 | 72 | 20 | 12 | 18 | 1.07 *1.14* | 0.81% *1.33%* | David J. Wallack | 11.6 |
| | -0.61% | 13.68% | -0.25% | 6.81% | 8.60% | 1346 | 58 | 38 | 5 | 21 | 1.04 | 0.66% | Management Team | 27.9 |
| *Vanguard Mid Cap Index Signal (VMISX)* | 5.42% *0.94%* | 16.39% *14.19%* | 0.24% *-0.94%* | 5.29% *4.68%* | 2.53% | 1346 | 13 | 24 | 26 | 13 | 1.00 *1.04* | 0.05% *1.20%* | Michael H. Buck | 20.6 |
| | 0.80% | 15.72% | 4.10% | 7.29% | 9.75% | 1297 | 33 | 8 | 11 | 11 | 1.05 | 0.81% | Joseph M. Milano | 10.0 |
| *Vanguard Mid Cap Index Signal (VMISX)* | 5.16% *0.87%* | 15.71% *14.83%* | 2.28% *0.9%* | 0.00% *5.19%* | 9.64% | 1297 | 34 | 29 | 0 | 6 | 0.89 *1.08* | 1.08% *1.31%* | William Danoff | 9.0 |
| American Century Small Cap Value Inv (ASVIX) *Average Small-Cap Value* | -2.06% *-2.74%* | 16.92% *17.37%* | 2.30% *-0.20%* | 7.95% *7.34%* | 10.76% | 253 | 86 | 10 | 36 | 19 | 1.18 *1.33* | 1.41% *1.49%* | Management Team | 14.0 |
| Vanguard Mid Cap Index (VIMSX) *Average Mid-Cap Blend* | -2.88% *-5.10%* | 19.43% *15.98%* | 0.53% *-0.76%* | 7.70% *6.75%* | 8.06% | 311 | 10 | 34 | 21 | 15 | 1.15 *1.17* | 0.24% *1.32%* | Donald M. Butler | 14.2 |
| T. Rowe Price Small Cap Value (PRSVX) | 1.47% *-3.71%* | 18.10% *17.18%* | 2.25% *-0.48%* | 8.84% *6.63%* | 11.51% | 518 | 30 | 10 | 11 | 8 | 1.15 *1.25* | 0.97% *1.38%* | Preston G. Athey | 20.9 |
| Mutual Global Discovery Z (MDISX) *Average World Stock* | -2.96% *-7.48%* | 8.56% *10.79%* | -0.03% *-2.71%* | 8.60% *5.93%* | 11.97% | 515 | 78 | 18 | 7 | 3 | 0.60 *0.83* | 1.01% *1.48%* | Management Team | 2.6 |
| American Funds EuroPacific Growth R4 (REREX) *Average Foreign Large Cap Blend* | -12.95% *-13.86%* | 7.14% *6.38%* | -2.59% *-3.67%* | 7.37% *4.73%* | 7.04% | 582 | 35 | 12 | 8 | 9 | 0.95 *0.98* | 0.85% *1.40%* | Management Team | 28.3 |
| First Eagle Overseas A (SGOVX) *Average Foreign Small/Mid Cap Blend* | -5.75% *-13.81%* | 10.27% *9.41%* | 2.30% *-4.18%* | 11.40% *8.95%* | 11.61% | 37 | 40 | 3 | 20 | 3 | 0.58 *0.68* | 1.14% *1.50%* | Management Team | 4.8 |
| Oppenheimer Developing Markets Y (ODVYX) *Average Diversified Emerging Markets* | -9.98% *-16.10%* | 14.35% *8.96%* | 4.26% *-2.02%* | 17.83% *12.77%* | 11.87% | 243 | 4 | 3 | 1 | 4 | 0.95 *0.99* | 1.00% *1.67%* | Justin Leverenz | 5.2 |
| T. Rowe Price Real Estate (TRREX) *Average Real Estate* | 11.64% *11.73%* | 32.73% *31.44%* | 2.18% *1.80%* | 10.95% *9.39%* | 10.19% | 199 | 23 | 49 | 26 | 47 | 0.99 *0.96* | 0.78% *1.40%* | David M. Lee | 14.8 |
| Prudential Jennison Natural Resources Z (PNRZX) *Average Natural Resources* | -26.25% *-19.00%* | 7.37% *8.13%* | -1.55% *-2.73%* | 13.72% *10.30%* | 11.84% | 98 | 50 | 15 | 3 | 35 | 1.33 *1.23* | 0.88% *1.57%* | Management Team | 7.3 |

MULTI-FACTOR INVESTMENT FUND RATING SCORING SYSTEM AND METHOD

BACKGROUND OF THE INVENTION

Field of the Invention

The present invention relates generally to mutual funds, and more particularly to a system of and method for generating investment fund rating scores using a number of factors including criteria related to risk factors, performance, and qualitative factors.

The investment market is awash with nearly unlimited investment options, and in the last several decades mutual funds have become particularly popular with individuals, particularly in 401(k) programs and also for IRA investments. Mutual funds are professionally managed collective investment vehicles that pool money from many investors to purchase securities. Most mutual funds offer the advantage that they are "open-ended," meaning that investors can buy or sell shares of mutual funds at any time. The expenses of mutual funds are borne by the investors, and can vary considerably from fund to fund.

Mutual funds are typically classified by the type of investments they hold. There are four primary categories of mutual funds: money market funds, which invest in fixed income securities with a high credit quality and typically with a relatively short time to maturity; bond or fixed income funds, which invest in fixed income or debt securities (such as investment-grade corporate bonds, government bonds, municipal bonds, and high-yield or junk bonds); stock or equity funds which invest in common stocks which represent an ownership share (or equity) in corporations; and hybrid funds, which invest in both bonds and stocks or in convertible securities (security that can be converted into another security). Within these categories, funds may also be subclassified by their investment objective, their investment approach, or by their specific focus.

As is the case with any type of investment, mutual funds involves the risk that investors may lose money, including the investment principal, or fail to earn any return on the investment. Different types of mutual funds have different levels of risk, with mutual funds having a prospectively higher rate of return also having a higher level of risk. Typically, 401(k) programs and IRA investment advisors both present potential mutual fund investments that are arranges by risk, from the lowest risk at one end to the highest risk at the other end. A company's 401(k) program will thus provide the company's employees with a limited choice of investment options, and employees are encouraged to diversify their investments, since the returns of different types of investments, particularly those having different risk categories, generally do not move up and down at the same time.

Since most investors in 401(k) programs and IRA's are not very knowledgeable and do not have the time to become experts, it can be challenging for them to decide which investments to hold in their 401(k)'s and IRA's. Similarly, it can also be challenging for those setting up 401(k) programs to select the investment menu that will be offered to employees. The most basic information that is looked to is historical fund performance, with three-year performance, five-year performance, ten-year performance, and even performance since inception information being readily available. The problem with looking only at historical performance is that the market typically changes about every five years, with investments that have performed well in the last five years not being the best performers going forward, and with investments that have not performed especially well in the last five years potentially becoming the better performers in the years ahead.

While a lot of other information about the mutual funds is available, most 401(k) investors and IRA investors lack the knowledge to make use of such information. As might be expected, there have been efforts to provide ratings of mutual funds that would be of use to potential investors. One such effort is taught by U.S. Pat. No. 7,536,333, to Omansky, which is directed to a system of hedge fund ratings. The Omansky patent interpolates, based on at least three data points pertinent to a numerical investment characteristic, a formula describing the desirability of a fund based on the numerical investment characteristic to produce a numerical rating. This is presently seen as not being particularly desirable since it is based upon only three data points and is thus highly susceptible to producing flawed if not completely valueless results given the volatility of the various characteristics of mutual funds.

Another past effort is taught by U.S. Pat. No. 7,899,728, to Egan, which is directed to a method to assign ratings to a mutual fund to calculate an expected return over a time period for a sector corresponding to the mutual fund based upon financial futures corresponding to the sector, an expected range of returns for the sector based on prices of options for the futures, the calculated expected return for the corresponding sector, and the expected range of returns for the corresponding sector. Unfortunately, relying on ratings based upon such future prognostications is not necessarily a very accurate manner of rating funds.

Yet another effort is taught by U.S. Pat. No. 8,239,305, to Brooks, which is directed to a system for analyzing attributes of investments that determines and/or evaluates relative positions of investments with respect to evaluation parameters and attributes obtained and graphically displays the relative positions of investments with respect to each another. However, this graphical presentation is only helpful with respect to a particular portfolio in displaying the investments in a graphic array, and as such is believed to not be useful to actually rate mutual funds.

Still another effort is taught by U.S. Patent Application Publication No. 2009/0198633, to Howard et al., which is directed to a system and method that determines a diamond rating based upon first rating component indicating the degree to which a fund manager or a first set of assets is attempting to outperform and/or outperforming a benchmark index, and a second rating component indicating the degree of success of the fund manager or the first set of assets. Unfortunately, basing a rating upon how the fund manager's or the assets actual performance compares to their/its stated attempted performance is of limited utility at the most, and as such is not deemed to present significant advantage as a tool to evaluate mutual funds.

Finally, another effort is taught by U.S. Patent Application Publication No. 2002/0116310, to Cohen et al., is directed to a system and method for comparing the performance of investment opportunities using subjective data and objective data to which an investor's weighting factors are applied. The Cohen et al. reference analyzes investment strategies limited to the sale of puts, the sale of calls, the purchase of puts, the purchase of calls, the purchase of stock, the short sale of stock, and credit put and call spreads. As such, it does not rate mutual funds at all, but rather is useful to sophisticated investors in portfolios outside the 401(k) and IRA areas of investment.

A variety of investment companies also offer ratings systems. For example, LPL Financial Return Retirement Partners offers a 12 point system (0-12) based upon quantitative factors (risk and risk-adjusted factors, performance factors, and "style" factors) and qualitative factors. Each of the criteria used are awarded based upon a pass/fail criteria, and thus a mutual fund that would have a 100% rating on a factor will yield the same result as a mutual fund having a 50.01% rating. It thus is believed to be an inadequate measure of mutual fund performance.

Lipper, Inc. offers the Lipper Leader Rating System, which offers five ratings each from 1 to 5 based upon the factors of total return, consistent return, preservation (based upon the number of negative monthly returns over a period of time), expense, and tax efficiency. These ratings are assigned based upon which of the five 20% segments a particular fund falls into. Thus, a mutual fund that would have a 100% rating on a factor will yield the same result as a mutual fund having a 80.01% rating. Further, the Lipper ratings assign equal weighting to three-year, five-year, and ten-year performance. The Lipper ratings also do not provide a single rating for mutual funds, but rather multiple rating factors, making the Lipper ranging suitable for power investors but much less useful for investors having 401(k) or IRA investments.

Morningstar, Inc. provides a "star rating" within four comparison groups, namely U.S. stock funds, international stock funds, taxable bond funds, and municipal bond funds. The Morningstar star ratings are assigned based upon which of five segments (0-10%, 10.01%-32.5%, 32.51%-67.5%, 67.51%-90%, and 90.01%-100%) a particular fund falls into. Thus, a mutual fund that would have a 67.5% rating on a factor will yield the same result as a mutual fund having a 32.51% rating. This is quite simply unacceptable. Other characteristics of the Morningstar star ratings such as assigning a greater degree of significance to longer term performance are also inconsistent with the observed behavior of the market, which typically changes about every five years, with investments that have performed well in the ten-year term not necessarily being better performers than investments that have performed well in the shorter, i.e. three-year and less term.

Other ratings systems have similar drawbacks to those discussed above. For example, fi360, Inc. uses quartiles, which are even less beneficial than Lipper's use of 20% segments. The fi360 rating also has the downside of having zero as the perfect score, a drawback that could well be misunderstood by 401(k) investors and IRA investors. Einstein Financial Services uses a pass/fail criteria both in subjective and objective criteria, with only a single qualitative criteria having the three values of zero, one, or two. Further, the Einstein Financial Services rating uses only the most recent five-year period, and is thus doubly deficient in that it ignores both shorter term and longer term performance.

It will thus be appreciated that it would be desirable to provide a system and method to provide a multi-factor investment fund rating scoring system and method that is useful particularly in the context of 401(k) and IRA investment programs. It would also be desirable that such a system and method provide a comprehensive and effective manner of rating mutual funds that differentiates between mutual funds with a degree of precision not possible in segmented or zero/one ratings. It would further be desirable that the system and method provide mutual fund ratings in a single readily understood form rather than as a chart or in a scoring system not readily understandable by 401(k) and IRA investors.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are overcome by the present invention. With this invention, a multi-factor investment fund rating scoring system and method is provided that uses risk factors, performance, and qualitative factors to evaluate mutual funds in a manner that compares the mutual funds to other mutual funds in the same investment category to provide a relative indication of the quality of each mutual fund.

Funds having less than a three-year history are not rated, while funds having a five or ten year history are evaluated over different terms, with weighting applied to the historical information to minimize the effect of short-term fluctuations. Weighting is also provided to establish the relative contributions of each of the evaluated factors. The ratings are also presented in an easy-to-understand form, such as a 1-100 rating score format.

The ratings can be used to select, evaluate, and monitor mutual funds, and are preferably based on various quantitative measurements of a mutual fund's risk and performance, while also incorporating qualitative factors such as manager tenure and expenses.

In a system embodiment, a system for generating relative ratings of mutual funds comprises: a computer readable investment information database configured to store information including historical performance information for a large plurality of mutual funds of at least two different investment categories; a rating scoring system processor coupled to the investment information database, with the rating scoring system processor configured to: for each mutual fund to be rated, determine whether historical performance information for at least one of at least two different time periods exists; for each mutual fund to be rated having historical performance information for at least one time period, determining, based upon the historical performance information, a relative ranking of the mutual fund to be rated with other mutual funds that are in the same investment category as the mutual fund to be rated for each of a plurality of factors; wherein the plurality of factors includes a performance factor, at least one risk factor, and at least one qualitative factor; and wherein if the mutual fund to be rated has historical performance information for multiple time periods, a separate ranking is determined for at least some of the plurality of factors for each of the multiple time periods; for each of the plurality of factors for each mutual fund to be rated that has separate rankings for each of multiple time periods, applying a time-based weighting to the separate rankings for such factors and combining the weighted separate rankings for each of such factors into a single ranking for each such factor; and for each mutual fund to be rated, applying a factor weighting to the rankings for each of the plurality of factors and combining the weighted plurality of factors into a single rating of the mutual fund being rated.

In another system embodiment, a system for generating relative ratings of mutual funds comprises: a computer readable investment information database configured to store information including historical performance information for a large plurality of mutual funds of multiple different investment categories; a rating scoring system processor coupled to the investment information database, with the rating scoring system processor configured to: for each mutual fund to be rated, determine whether historical performance information for at least one of at least three different time periods exists; for each mutual fund to be rated having historical performance information for at least one time period, determining, based upon the historical performance information, a relative ranking of the mutual fund to be rated with other mutual funds that are in the same investment category as the mutual fund to be rated for each of a plurality of factors; wherein the plurality of factors includes a performance factor, a plurality of risk factors, and a plurality of qualitative factors; and wherein if the mutual fund to be rated has historical performance information for multiple time periods, a separate ranking is determined for each time period for each of the factors having historical performance information for multiple time periods; for each of the plurality of factors for each mutual fund to be rated that has separate rankings for each of the multiple time periods, applying a time-based weighting to the separate rankings for such factors and combining the weighted separate rankings for each of such factors into a single ranking for each such factor; and for each mutual fund to be rated, applying a factor weighting to the rankings for each of the plurality of factors and combining the weighted plurality of factors into a single rating of the mutual fund being rated.

In still another system embodiment, a system for generating relative ratings of mutual funds comprises: a computer readable investment information database configured to store information including historical performance information for a large plurality of mutual funds; a rating scoring system processor coupled to the investment information database, with the rating scoring system processor configured to: for each mutual fund to be rated, determine whether historical performance information for at least one of at least two different time periods exists; for each mutual fund to be rated having historical performance information for at least one time period, determining a relative ranking of the mutual fund to be rated with other mutual funds for each of a plurality of factors; wherein if the mutual fund to be rated has historical performance information for multiple time periods, a separate ranking is determined for at least some of the plurality of factors for each time period; for each of the plurality of factors for each mutual fund to be rated that has separate rankings for multiple time periods, applying a time-based weighting and combining the weighted separate rankings into a single ranking for each factor; and applying a factor weighting to the rankings for each of the plurality of factors and combining the weighted plurality of factors into a single rating of the mutual fund being rated.

In a method embodiment, a method for generating relative ratings of mutual funds comprises: storing information including historical performance information for a large plurality of mutual funds of at least two different investment categories in an investment information database; for each mutual fund to be rated, determining whether historical performance information for at least one of at least two different time periods exists; for each mutual fund to be rated having historical performance information for at least one time period, determining, based upon the historical performance information, a relative ranking of the mutual fund to be rated with other mutual funds that are in the same investment category as the mutual fund to be rated for each of a plurality of factors; if the mutual fund to be rated has historical performance information for multiple time periods, determining a separate ranking for at least some of the plurality of factors for each of the multiple time periods; for each of the plurality of factors for each mutual fund to be rated that has separate rankings for each of the multiple time periods, applying a time-based weighting to the separate rankings for such factors and combining the weighted separate rankings for each of such factors into a single ranking for each such factor; and for each mutual fund to be rated, applying a factor weighting to the rankings for each of the plurality of factors and combining the weighted plurality of factors into a single rating of the mutual fund being rated.

The multi-factor investment fund rating scoring system and method of the present invention provides a comprehensive and effective manner of rating mutual funds that differentiates between mutual funds with a degree of precision not possible in segmented or zero/one ratings that is particularly useful in the context of 401(k) and IRA investment programs. Further, the multi-factor investment fund rating scoring system and method of the present invention provide mutual fund ratings in a single readily understood form rather than as a chart or in a scoring system not readily understandable by 401(k) and IRA investors. Finally, the multi-factor investment fund rating scoring system and method of the present invention achieves numerous advantages without incurring any substantial relative disadvantage.

DESCRIPTION OF THE DRAWINGS

These and other advantages of the present invention are best understood with reference to the drawings, in which:

FIG. 4 is an exemplary chart showing investment fund factors, time-based factor weightings, and relative investment fund factor weightings used to generate the investment fund ratings by the process illustrated in FIG. 3;

FIG. 5 is a somewhat schematic block diagram of an exemplary process that may be used by the multi-factor investment fund rating scoring system illustrated in FIG. 1 to generate a client report including both statistical information and the investment fund ratings generated by the process illustrated in FIG. 3; and FIG. 6 is an exemplary client report that may be generated by the exemplary process illustrated in FIG. 5.

DETAILED DESCRIPTION OF AN EXEMPLARY EMBODIMENT

Figure 1:
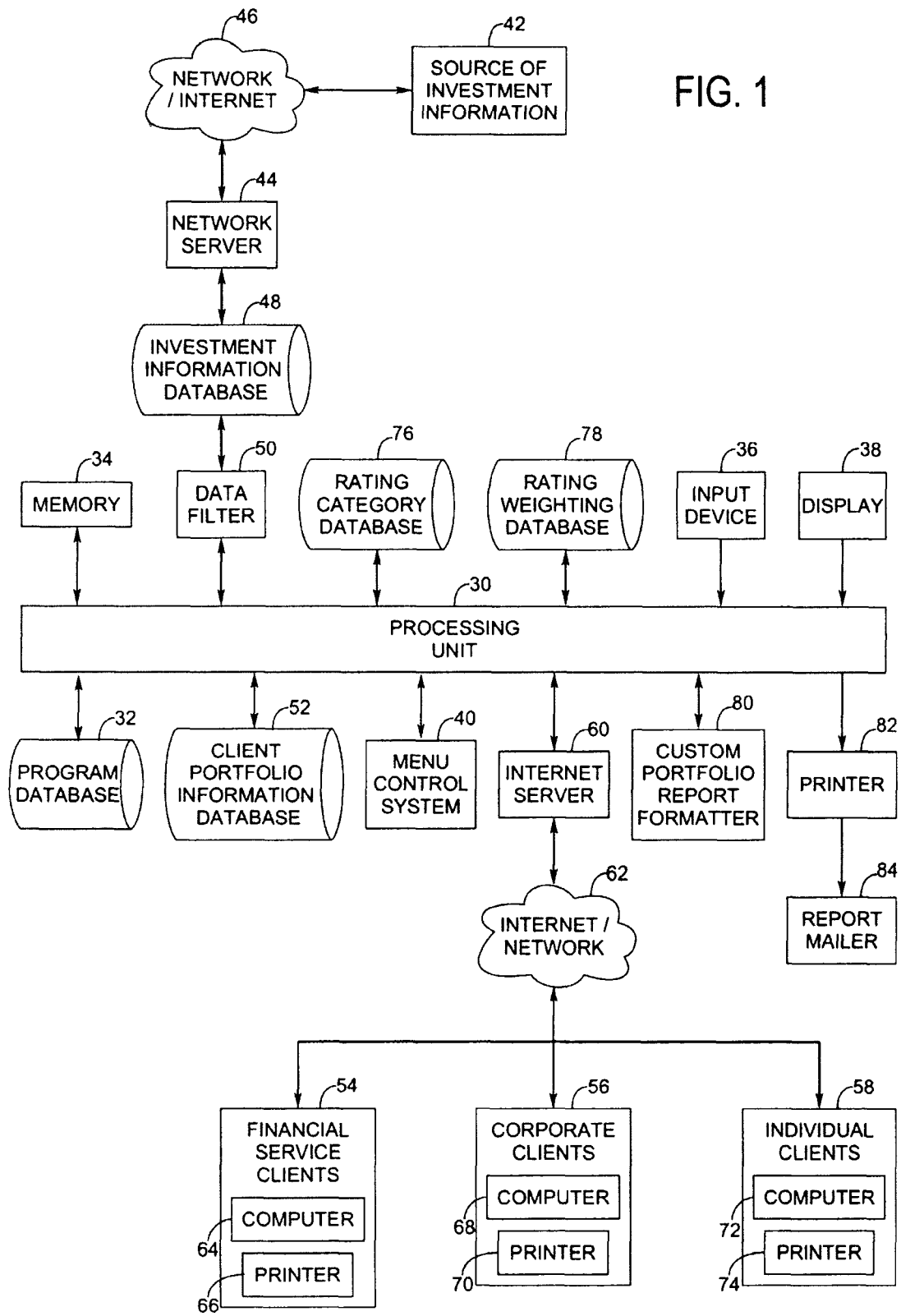
FIG. 1 is a somewhat schematic block diagram showing an overview of an exemplary system that may be used by the multi-factor investment fund rating scoring system and method of the present invention.

An exemplary embodiment of the multi-factor investment fund rating scoring system of the present invention may be provided by the system illustrated in schematic block diagram fashion in FIG. 1. The multi-factor investment fund rating scoring system includes a processor unit 30 to which a variety of system hardware and system modules are operatively interconnected. A program database 32 is operatively interconnected to the processor unit 30 to store software used by the multi-factor investment fund rating scoring system that is not stored in firmware. A memory 34 is also operatively interconnected to the processor unit 30 to store transient information used by the multi-factor investment fund rating scoring system.

An input device 36 is operatively interconnected to the processor unit 30 to provide operator inputs to the multi-factor investment fund rating scoring system, and can include, for example, a keyboard and a mouse. A display 38 is also operatively interconnected to the processor unit 30 for use by the operator. A menu control system 40 operatively interconnected to the processor unit 30 provides various menus which are displayed by the display 38 to the operator to facilitate the operation of the multi-factor investment fund rating scoring system of the present invention.

The multi-factor investment fund rating scoring system of the present invention obtains information regarding all mutual funds from a source of investment information 42, which may be a source such as Morningstar, Inc. The source of investment information 42 is obtained by the multi-factor investment fund rating scoring system using a network server 44 via a network/Internet connection 46, which may be either a direct networked connection or through a network such as the Internet. The investment information obtained from the source of investment information 42 is stored by the multi-factor investment fund rating scoring system in an investment information database 48, which the desired subset of the investment information that will be used by the multi-factor investment fund rating scoring system of the present invention being provided to the processor unit 30 via a data filter 50.

The multi-factor investment fund rating scoring system has a client portfolio information database 52 operatively interconnected to the processor unit 30 that contains, for each client of the operator of the multi-factor investment fund rating scoring system, a list of the mutual funds offered by that client in that client's 401(k) plan or held by the client in an IRA. Such clients may be a financial service client 54, a corporate client 56, and even an individual client 58. Typically, each of the financial service client 54, the corporate client 56, and the individual client 58 interact with the multi-factor investment fund rating scoring system using an Internet server 60 operatively interconnected to the processor unit 30 through the Internet or a dedicated network as indicated by an Internet/network connection 62.

Typically, the financial service client 54 will have a computer 64 to interact with the multi-factor investment fund rating scoring system and a printer 66 to print out information from the multi-factor investment fund rating scoring system. Similarly, the corporate client 56 will have a computer 68 and a printer 70 to print out information, and the individual client 58 will have a computer 72 and a printer 74 to print out information.

Since the multi-factor investment fund rating scoring system of the present invention will generate ratings for the mutual funds offered by clients in their 401(k) plans or held by clients in their IRA's, it will base these ratings on a plurality of categories of information. The various ratings categories that may be used by the multi-factor investment fund rating scoring system are stored in a rating category database 76 that is operatively interconnected to the processor unit 30. The multi-factor investment fund rating scoring system of the present invention will combine the results of ratings in each of the categories for each of the mutual funds using selected weighting criteria that are stored in a rating weighting database 78 that is also operatively interconnected to the processor unit 30.

Once the ratings for each of the mutual funds offered by a client in its 401(k) plan or IRA portfolio have been generated, an investment fund scorecard will be formatted by a custom portfolio report formatter 80 that is operatively interconnected to the processor unit 30. Once formatted, the investment fund scorecards can be printed by a printer 82 that is operatively interconnected to the processor unit 30, following which the investment fund scorecards can be mailed by a report mailer 84.

Figure 2:
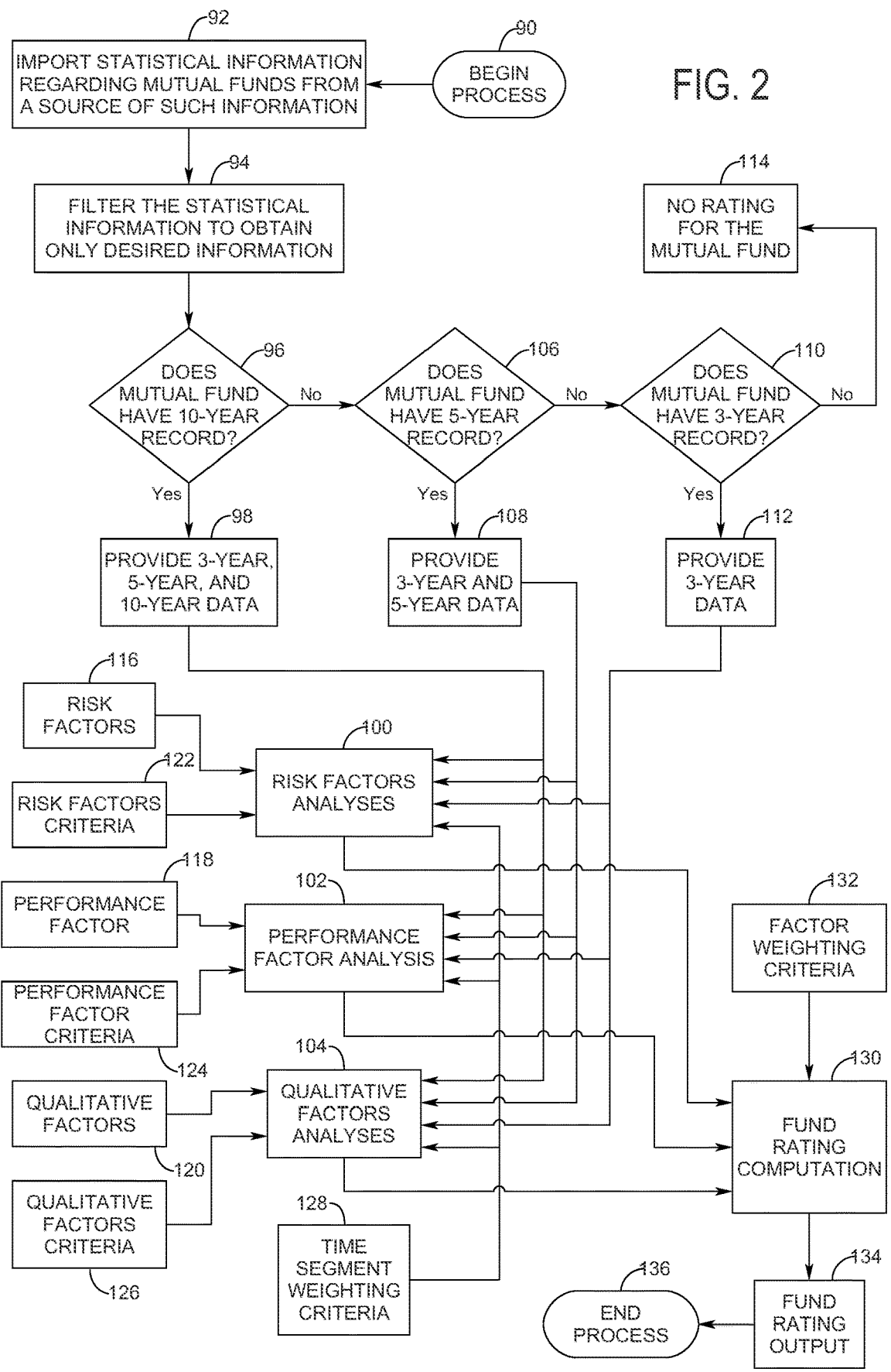
FIG. 2 is a somewhat schematic block diagram showing an overview of an exemplary process that may be used by the multi-factor investment fund rating scoring system illustrated in FIG. 1 to provide investment fund ratings based upon statistical information.

Referring next to FIG. 2, the multi-factor investment fund rating scoring method of the present invention is illustrated in part. From a process initiation step 90, the process moves to an import statistical information step 92 in which the multi-factor investment fund rating scoring method imports information regarding all mutual funds from a source of investment information such as Morningstar, Inc. It will be appreciated by those skilled in the art that there are a very large number of mutual funds, and for each of these funds there is a large amount of information that is provided by Morningstar to subscribers in the form of a very large database.

Next, the multi-factor investment fund rating scoring method filters the Morningstar information in a filter statistical information step to obtain information on all of the mutual funds that are needed (which is dependent upon the customers of the multi-factor investment fund rating scoring method) and only the portion of the information for each of the mutual funds that is necessary for the ratings. Following the filter statistical information step 94, it will be understood that each of the mutual funds are then analyzed as described in the following steps, which outline the analysis process for a single mutual fund.

The process next moves to a does fund have a ten-year record determination step 96 in which it is determined whether the mutual fund being analyzed has data for a ten-year history of the mutual fund. If there is a ten-year history, the process moves to a provide three-year, five-year, and ten-year data step 98 in which three-year, five-year, and ten-year data for the mutual fund being analyzed is provided to a risk factors analysis step 100, a performance factor analysis step 102, and a qualitative factors analysis step 104. The analyses that is performed in the risk factors analysis step 100, the performance factor analysis step 102, and the qualitative factors analysis step 104 will be described in due course below.

If, on the other hand, it is determined in the ten-year record determination step 96 that the mutual fund being analyzed does not have data for a ten-year history of the mutual fund, the process moves instead to a does fund have a five-year record determination step 106 in which it is determined whether the mutual fund being analyzed has data for a five-year history of the mutual fund. If there is a five-year history, the process moves to a provide three-year and five-year data step 108 in which three-year and five-year data for the mutual fund being analyzed is provided to the risk factors analysis step 100, the performance factor analysis step 102, and the qualitative factors analysis step 104.

If, on the other hand, it is determined in the does fund have a five-year record determination step 106 that the mutual fund being analyzed does not have data for a five-year history of the mutual fund, the process moves instead to a does fund have a three-year record determination step 110 in which it is determined whether the mutual fund being analyzed has data for a three-year history of the mutual fund. If there is a three-year history, the process moves to a provide three-year data step 112 in which three-year data for the mutual fund being analyzed is provided to the risk factors analysis step 100, the performance factor analysis step 102, and the qualitative factors analysis step 104.

If, on the other hand, it is determined in the does fund have a three-year record determination step 110 that the mutual fund being analyzed does not have data for a three-year history of the mutual fund, the mutual fund will not be rated by the multi-factor investment fund rating scoring system and method of the present invention, and the process moves instead to a no rating for the mutual fund termination step 114.

There are several other inputs that are provided to the risk factors analysis step 100, the performance factor analysis step 102, and the qualitative factors analysis step 104. The first of these additional inputs is identification of which factors are to be analyzed in the risk factors analysis step 100, the performance factor analysis step 102, and the qualitative factors analysis step 104. In this regard, risk factors 116 are identified to the risk factors analysis step 100, performance factors 118 are identified to the performance factor analysis step 102, and qualitative factors 120 are identified to the qualitative factors analysis step 104.

The second of the additional inputs that are provided to the risk factors analysis step 100, the performance factor analysis step 102, and the qualitative factors analysis step 104 is the criteria relating to the analyses to be performed in the risk factors analysis step 100, the performance factor analysis step 102, and the qualitative factors analysis step 104. In this regard, risk factors criteria 122 are provided to the risk factors analysis step 100, performance factor criteria 124 is provided to the performance factor analysis step 102, and qualitative factors criteria 126 are provided to the qualitative factors analysis step 104.

The third of the additional inputs that are provided to the risk factors analysis step 100, the performance factor analysis step 102, and the qualitative factors analysis step 104 is a time segment weighting criteria 128. The time segment weighting criteria 128 is used to provide time-based weighting to the analyses performed so that emphasis can be placed on data from at least one time period while respectively deemphasizing data from at least one other time period, as will become apparent in conjunction with the discussion of FIG. 4 below.

Thus, the various analyses of the mutual fund data are performed in the risk factors analysis step 100, the performance factor analysis step 102, and the qualitative factors analysis step 104, with the results from each of the risk factors analyzed in the risk factors analysis step 100, the results of the performance factor analyzed in the performance factor analysis step 102, and the results of the qualitative factors analyzed in the qualitative factors analysis step 104 all being provided to a fund rating computation 130. Also provided to the fund rating computation 130 are factor weighting criteria 132 which establish how much relative weight is given to each of the risk factors, the performance factor, and the qualitative factors.

Based upon the weighted results of the risk factors from the risk factors analysis step 100, the performance factor from the performance factor analysis step 102, and the qualitative factors from the qualitative factors analysis step 104, the fund rating computation 130 generates a rating for the mutual fund being analyzed and provides it as a fund rating output 134. Following a generation of ratings for all of the mutual funds being considered, the method depicted in FIG. 2 tends in a process termination step 136.

Figure 3:
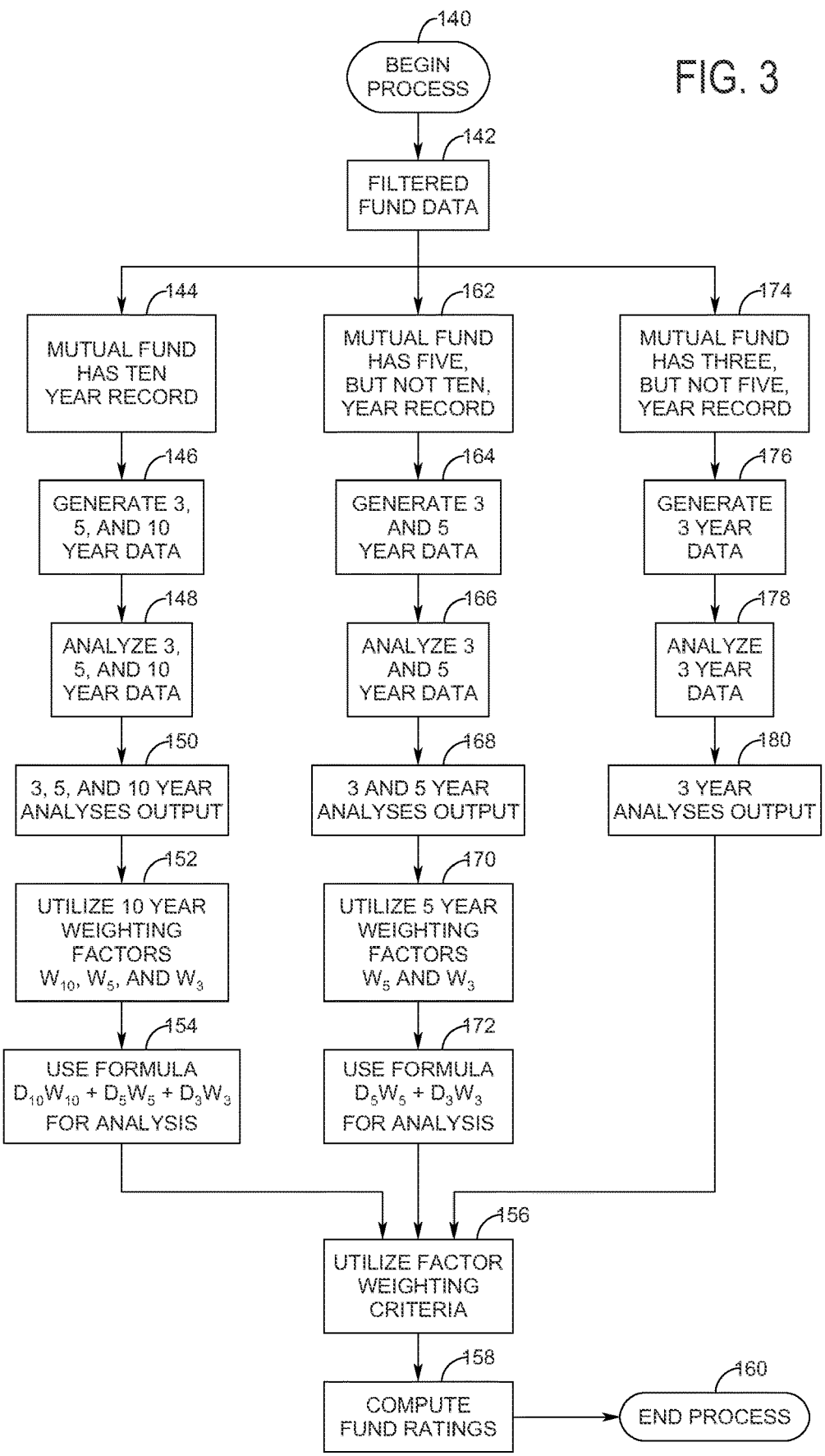
FIG. 3 is a somewhat schematic block diagram showing detailed portions of the exemplary process illustrated in FIG. 2 that analyze the statistical information to generate investment fund ratings.

Referring now to FIG. 3, an exemplary process that may be used by the multi-factor investment fund rating scoring system and method of the present invention to analyze the filtered statistical information from Morningstar to generate investment fund ratings is shown. The process begins with a process initiation step 140, and moves to a step in which filtered mutual fund data 142 is accessed to obtain the data regarding a mutual fund to be analyzed. Depending upon how much data is available for the mutual funds being analyzed (which is determined in the does fund have a ten-year record determination step 96, the does fund have a five-year record determination step 106, and the does fund have a three-year record determination step 110 in FIG. 2), the process will move through one of three paths.

If there is ten years of data available for the mutual funds being analyzed, the process moves to a mutual fund has ten year record step 144. From there, the process moves to a generate three, five, and ten year data step 146 in which data for each of the factors being evaluated for the mutual fund is generated that have time factor associated therewith is processed to generate three-year data, five-year data, and ten-year data. (Data for each of the factors being evaluated for the mutual fund is generated that do not have a time factor associated therewith are also processed and provided as factor outputs that will be provided to a utilize factor weighting criteria step 156 that will be described below.) To be specific, this means that data for the last three years, data for the last five years, and data for the last ten years is generated for each of these factors having a time factor associated therewith, and is provided to a three, five, and ten year analysis step 148 which provides as an output a three, five, and ten year analyses output 150. This analysis is made for each mutual fund to determine its standing in each of the factors evaluated with respect to all of the mutual funds in its particular market segment.

Next, time segment weighting criteria for the three time periods, namely a ten-year weighting criteria $W_{10}$, a five-year weighting criteria $W_5$, and a three-year weighting criteria $W_3$ are provided in a utilize ten-year weighting factors step 152. These weighting criteria from the utilize ten-year weighting factors step 152 and the three-year data, the five-year data, and the ten-year data from the three, five, and ten year analyses output 150 are applied in a use ten-year formula for analysis step 154 to generate a single numerical rating for each of the factors being evaluated for the mutual fund.

These numerical rating for the factors being evaluated for the mutual fund are provided to a utilize factor weighting criteria step 156 in which relative weights are assigned to each of the factors, with the factors and the relative weights being used in a compute fund ratings step 158 to combine them into a single numerical rating of the mutual fund being evaluated. The process then ends for the particular ten-year data mutual fund being evaluated in a process termination step 160.

Returning to the filtered mutual fund data 142, if there is only five (and not ten) years of data available for the mutual fund being analyzed, the process moves to a mutual fund has five year record step 162. From there, the process moves to a generate three and five year data step 164 in which data for each of the factors being evaluated for the mutual fund is generated that have time factor associated therewith is processed to generate three-year data and five-year data.

(Data for each of the factors being evaluated for the mutual fund is generated that do not have a time factor associated therewith are also processed and provided as factor outputs that will be provided to the utilize factor weighting criteria step 156.) To be specific, this means that data for the last three years and data for the last five years is generated for each of these factors having a time factor associated therewith, and is provided to a three and five year analysis step 166 which provides as an output a three and five year analyses output 168. This analysis is made for each mutual fund to determine its standing in each of the factors evaluated with respect to all of the mutual funds in its particular market segment.

Next, time segment weighting criteria for the two time periods, namely a five-year weighting criteria $W_5$ and a three-year weighting criteria $W_3$ are provided in a utilize five-year weighting factors step 170. These weighting criteria from the utilize five-year weighting factors step 170 and the three-year data and the five-year data from the three and five year analyses output 168 are applied in a use five-year formula for analysis step 172 to generate a single numerical rating for each of the factors being evaluated for the mutual fund.

These numerical ratings for the factors being evaluated for the mutual fund are provided to the utilize factor weighting criteria step 156 in which relative weights are assigned to each of the factors, with the factors and the relative weights being used in the compute fund ratings step 158 to combine them into a single numerical rating of the mutual fund being evaluated. The process then ends for the particular five-year data mutual fund being evaluated in a process termination step 160.

Returning to the filtered mutual fund data 142, if there is only three (and not five or ten) years of data available for the mutual fund being analyzed, the process moves to a mutual fund has three year record step 174. From there, the process moves to a generate three year data step 176 in which data for each of the factors being evaluated for the mutual fund is generated that have time factor associated therewith is processed to generate three-year data. (Data for each of the factors being evaluated for the mutual fund is generated that do not have a time factor associated therewith are also processed and provided as factor outputs that will be provided to the utilize factor weighting criteria step 156.) To be specific, this means that data for the last three years is generated for each of these factors, and is provided to a three year analysis step 178 which provides as an output a three year analyses output 180. This analysis is made for each mutual fund to determine its standing in each of the factors evaluated with respect to all of the mutual funds in its particular market segment.

The three year analyses output 180 thus comprises numerical rating for the factors being evaluated for the mutual fund are provided to the utilize factor weighting criteria step 156 in which relative weights are assigned to each of the factors, with the factors and the relative weights being used in the compute fund ratings step 158 to combine them into a single numerical rating of the mutual fund being evaluated. The process then ends for the particular three-year data mutual fund being evaluated in a process termination step 160.

Referring next to FIG. 4, a chart shows exemplary investment fund factors, the time-based factor weightings, and the relative investment fund factor weightings that may be used to generate the investment fund ratings by the multi-factor investment fund rating scoring system and method of the present invention. This example utilizes nine factors: Standard Deviation, Beta, Up-Less-Down-Capture, Total Return, Information Ratio, R-Squared, Alpha, Manager Tenure, and Net Expense Ratio. The data for determining all of these factors may be obtained from Morningstar, as stated above.

Standard Deviation, Beta, and Up-Less-Down-Capture are Risk Factors. Standard Deviation is a statistical measure of the volatility of the fund's return. Beta is a measure of a fund's sensitivity to market movements; a portfolio with a Beta greater than one is more volatile than the market, and a portfolio with a beta of less than one is less volatile than the market. With regard to Up-Less-Down Capture, the Up Capture reflects how the investment has historically performed relative to the benchmark index in an Up market, and the Down Capture statistic measures the investments historical relative performance in Down Markets. The score measures Up Capture relative to Down Capture, giving a favorable score if Up Capture is greater than Down Capture.

Total Return is a Performance Factor, and reflects performance without adjusting for sales charges or the effects of taxation, but is adjusted to reflect all actual ongoing fund expenses and assumes reinvestment of dividends and capital gains.

Information Ratio, R-Squared, Alpha, Manager Tenure, and Net Expense Ratio are Qualitative Factors. Information Ratio measures a portfolio manager's ability to generate excess returns to a benchmark. R-Squared reflects the percentage of a fund's movements that is explained by movements in its benchmark index, showing the degree of correlation between the fund and the benchmark; this figure is also helpful in assessing how likely it is that alpha and beta are statistically significant. Alpha measures the difference between a fund's actual returns and its expected performance, given its level of risk (as measured by Beta); Alpha is often seen as a measure of the value added or subtracted by a portfolio manager. Manager Tenure is the length of time the lead manager or management team has been managing the fund. Net Expense Ratio (prospectus net expense ratio) reflects actual expenses paid by the fund as well as any voluntary waivers, reductions from brokerage service arrangements and any other expense offset arrangements.

The type of analysis to be performed depends upon the factor. All of the factors except Manager Tenure and Net Expense Ration are evaluated using a normal distribution of all of the mutual funds in that market segment. Thus, for example, consider the market segment of Average Large Cap Blend mutual funds, there are approximately 1297 different mutual funds in that category that will have each of the factors of each fund ranked as to their respective positions in each factor and for each time period. In a normal distribution analysis, the mutual fund having the highest rating for a particular factor will receive a score of 1 for that factor, while the mutual fund having the lowest rating for that particular factor will have a score of 100 for that factor. The Total Return factor is evaluated using a normal distribution to rank the mutual funds in this category based on three standard deviations. The factors of Manager Tenure and Net Expense Ration are evaluated using a Chi-Squared analysis since they are bound by zero, which they cannot go below.

In the time-based weighting, the multi-factor investment fund rating scoring system and method of the present invention weights longer-term measures more heavily than shorter-term measures, thereby enabling it to be able to better focus on the mutual fund's performance through multiple market cycles and helping to prevent retirement plan sponsors from making decisions based on short-term anomalies or results. Thus, in the example depicted in FIG.

4, for mutual funds having a ten-year record, the ten-year measures are weighted at 40%, while the five-year and the three-year measures are each weighted at 30%. Likewise, for mutual funds having a five-year record, the five-year measures are weighted at 60%, while the three-year measures are weighted at 40%. For mutual funds having a three-year record, the three-year measures are thus weighted at 100%. Further, it will be understood that the factors of Manager Tenure and Net Expense Ration are not time weighted.

In combining the time-weighted results of the various factors, the example provided herein weights the Risk Factors at 50% of the total mutual fund rating, the Performance Factor at 30% of the total mutual fund rating, and the Qualitative Factors at 20% of the total mutual fund rating. In the example provided, each of the Risk Factors is assigned equal weighting of 16.7%, and each of the Qualitative Factors is assigned an equal weighting of 4%. Alternately, for the Qualitative Factors, Information Ratio, R Squared, and Alpha may each be equally weighted at 5%, while Manager Tenure and Net Expense Ratio may each be weighted at 5% together or 2.5% each. It will be readily apparent that both the relative weightings of the Risk Factors, the Performance Factor, and the Qualitative Factors can be varied, as can the relative weightings of the constituent factors of the Risk Factors and the Qualitative Factors. However, it is a strong preference of the present invention that it use each of the three factor categories.

In a further strong preference of the multi-factor investment fund rating scoring system and method of the present invention, the final score ranks each of the mutual funds in each market segment as an integer on a 100-point scale (e.g., an integer from 1 to 100) using the arithmetic mean as the midpoint of all the funds in its market segment or investment category (e.g., the Morningstar Category; examples of investment categories that will be used in FIG. 6 include the 90 Day U.S. Treasury Bill, and averages for each of Intermediate-Term Bonds, Inflation-Protected Bonds, World Bonds, Moderate Allocation, Large Cap Value, Mid-Cap Value, Large Cap Blend, Large Cap Growth, Small-Cap Value, Mid-Cap Blend, Small Cap Blend, World Stocks, Foreign Large Cap Blend, Foreign Small/Mid Cap Blend, Diversified Emerging Markets, Real Estate, and Natural Resources). The best performing funds will be near one and the worst performing funds will be near one hundred. Scores of thirty or below are very suitable; scores of thirty to sixty are acceptable, and scores of sixty or over are placed onto a watch list.

While in the embodiment described above Performance is weighted at the processor unit 30% irrespective of whether there are ten, five, or only three years of history available for a mutual fund, it is possible, and indeed it may be desirable, to decrease the emphasis on Performance in computing the ratings for mutual funds having only five or three years of history. One way of doing so is to deemphasize the contribution of Performance for mutual funds having only five or three years of history.

An exemplary embodiment may reduce the contribution of Performance by 15% if there are only five years of history for a mutual fund, and reduce the contribution of Performance by 50% if there are only three years of history for a mutual fund. This results in a total score of 0.955 if there are only five years of history for a mutual fund, and a total score of 0.85 if there are only three years of history for a mutual fund. Thus, in order to normalize the results, the total must be divided by 0.955 if there are only five years of history for a mutual fund, and by 0.85 if there are only three years of history for a mutual fund.

The result of this change in weighting is to provide respective weightings of the client portfolio information database 52.4% for the Risk Factors, 26.7% for Performance, and 20.9% for the Qualitative Factors for a mutual fund having five years of history, and respective weightings of the client portfolio information database 58.8% for the Risk Factors, 17.7% for Performance, and 23.5% for the Qualitative Factors for a mutual fund having three years of history. Thus, for mutual funds having less than ten years of history it will be appreciated that the weighting given to the Performance factor can be relatively diminished.

Referring now to FIG. 5, an exemplary process that may be used to generate a client report including both statistical information and the investment fund ratings generated by the multi-factor investment fund rating scoring system and method of the present invention is shown. This process begins with an initiate process step 190, from which the process moves to a periodically download mutual funds information 192. In this step, the mutual funds information is obtained from a source such as Morningstar. This process may be performed at least quarterly if desired. This information is stored in a database in a store all mutual funds information step 194.

The process next moves to a periodically calculate mutual fund ratings step 196, from which the mutual fund ratings are stored in a database in a store mutual fund ratings step 198. Whenever a client of the operator of the multi-factor investment fund rating scoring system and method of the present invention requests an informational output in a request for information step 200, the multi-factor investment fund rating scoring system and method receives that request in a receive request to generate mutual fund information step 202.

Next, the process moves to an obtain funds list for the requesting client step 204 in which the client's list of mutual funds is obtained from a client funds list database 206. It will be appreciated by those skilled in the art that the list of mutual funds for each client of the multi-factor investment fund rating scoring system will, for example, have a specific list of mutual funds offered in their 401(k) program. This causes the multi-factor investment fund rating scoring system to obtain both the funds information for the mutual funds in the client's list from the store all mutual funds information step 194 and the fund ratings for the mutual funds in the client's list from the store mutual fund ratings step 198 in an obtain data for the client's mutual funds step 208.

Next, selected mutual fund information and mutual fund ratings for the mutual funds in the client's list are formatted for a report in a format client report step 210. Once the client report has been formatted, it can be printed in a print client report step 212, following which it may be provided to the client in either paper or electronic form (or both) in a provide client report to client step 214. The process then terminates in a process termination step 216.

Referring finally to FIG. 6, an exemplary client report 220 that has been generated by the exemplary process of FIG. 5 is shown. The client report 220 has a list of mutual fund names 222 on the left side that are included in the client's list of mutual funds included in, for example, a 401(k) program, that are arranged from top to bottom in the order of least risk to most risk. To the right of the list of mutual fund names 222 is a list of historical performance 224 of the mutual funds in five columns with the one-year, three-year, five-year, ten-year, and since inception returns. To the right of the historical performance 224 is a number of funds in class listing 226 that lists the number of mutual funds having at least a five-year track record in the particular class (the class is identified in the list of mutual fund names 222). To the right of the number of funds in class listing 226 is a list of Morningstar class ratings 228 in three columns with the three-year, five-year, and ten-year position of each of the listed mutual funds in their category.

The client report 220 has on its right side a column that provides a listing of manager tenure 230 for each fund, and with the manager name or the fund objective listed in a fund comments/manager column 232 to the left of the manager tenure 230. To the left of the fund comments/manager column 232 is a net expense ratio column 234 that provides the net expense ratio for each of the listed mutual funds. To the left of the net expense ratio column 234 is a Beta column 236 that provides the Beta for each of the listed mutual funds.

Finally, to the right of the list of Morningstar class ratings 228 and to the left of 236 is a mutual fund rating score 238 that provides the rating of the multi-factor investment fund rating scoring system and method of the present invention for each of the listed mutual funds. While much if not most of the rest of the information provided on the client report 220 may be incomprehensible to the unsophisticated viewer of the client report 220, it will be appreciated that the mutual fund rating score 238 is a highly simple, yet extremely accurate snapshot of each of the listed mutual funds, with an easy-to-understand 1-100 scoring system, with one being the best and 100 being the worst. It will also be understood that the multi-factor investment fund rating scoring system and method of the present invention could be used by clients to select which mutual funds will be included in the client report 220.

It may therefore be appreciated from the above detailed description of the preferred embodiment of the present invention that it provides a system and method that presents a comprehensive and effective manner of rating mutual funds that differentiates between mutual funds with a degree of precision not possible in segmented or zero/one ratings that is particularly useful in the context of 401(k) and IRA investment programs. The multi-factor investment fund rating scoring system and method of the present invention provide mutual fund ratings in a single readily understood form rather than as a chart or in a scoring system not readily understandable by 401(k) and IRA investors. Finally, the multi-factor investment fund rating scoring system and method of the present invention achieves numerous advantages without incurring any substantial relative disadvantage.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A system for generating relative ratings of mutual funds, comprising:
 a non-transitory computer readable investment information database configured to store information including historical performance information for a large plurality of mutual funds of at least two different investment categories, the information database coupled to a communications network and further configured to electronically receive performance information via the communications network;
 a network server connected via a network to a commercial source of investment information, wherein the network server is configured to periodically download investment information from the source of investment information, and configured to store the investment information in the investment information database;
 a data filter coupled to a rating scoring system processor, and configured to provide a desired subset of the investment information stored in the investment information database to a rating scoring system processor; and
 the rating scoring system processor coupled to the investment information database, and coupled to a rating weighting database and rating category database, the rating scoring system processor configured to electronically receive requests for mutual fund rating information and to electronically transmit the mutual fund rating information, with the rating scoring system processor further configured to:
 for each mutual fund to be rated, determine whether historical performance information for at least one of at least two different time periods exists;
 for each mutual fund to be rated having historical performance information for at least one time period, determining, based upon the historical performance information, a relative ranking of the mutual fund to be rated with other mutual funds that are in the same investment category as the mutual fund to be rated for each of a plurality of factors, the investment category being stored in the rating category database;
 wherein the plurality of factors includes a performance factor, at least one risk factor, and at least one qualitative factor; and
 wherein if the mutual fund to be rated has historical performance information for multiple time periods, a separate ranking is determined for at least some of the plurality of factors for each of the multiple time periods;
 for each of the plurality of factors for each mutual fund to be rated that has separate rankings for each of multiple time periods, applying a time-based weighting, retrieved from the rating weighting database, to the separate rankings for such factors and combining the weighted separate rankings for each of such factors into a single ranking for each such factor; and for each mutual fund to be rated, applying a factor weighting, retrieved from the rating weighting database, to the rankings for each of the plurality of factors and combining the weighted plurality of factors into a single rating of the mutual fund being rated;

wherein the performance factor is weighted at approximately 30%, the at least one risk factor is weighted at approximately 50%, and the at least one qualitative factor is weighted at approximately 20%.

2. A system as defined in claim 1, wherein the rating scoring system processor is configured to:
for each mutual fund to be rated, determine whether historical performance information for at least one of at least three different time periods exists.

3. A system as defined in claim 2, wherein the three different time periods comprise:
the most recent three year period for which historical performance information is available in the investment information database;
the most recent five year period for which historical performance information is available in the investment information database; and
the most recent ten year period for which historical performance information is available in the investment information database.

4. A system as defined in claim 3, wherein the ten-year measures are weighted at approximately 40%, the five-year measures are weighted at approximately 30%, and the three-year measures are weighted at approximately 30%.

5. A system as defined in claim 1, wherein the at least two different time periods comprise at least one longer term time period and at least one shorter term time period, wherein the at least one longer term time period is more heavily weighted than the at least one shorter term time period.

6. A system as defined in claim 1, wherein the rating scoring system processor is configured to:
not provide a rating for any mutual fund for which historical performance information is not available for at least one time period.

7. A system as defined in claim 1, wherein the single rating of each mutual fund comprises:
an integer between 1 and 100, wherein mutual funds having a rating near 1 are the best performing funds and mutual funds having a rating near 100 are the worst performing funds.

8. A system as defined in claim 7, wherein the ranking for each of the plurality of factors range on a 100 point scale in which the risk factors analysis step 100 is the worst.

9. A system as defined in claim 1, wherein the performance factor comprises: Total Return, which is a measure of performance that does not include adjustments for sales charges or the effects of taxation, but that does include adjustments reflecting all actual ongoing fund expenses and assuming reinvestment of dividends and capital gains.

10. A system as defined in claim 9, wherein the ranking for the performance factor Total Return is evaluated using a normal distribution to rank the mutual funds in that performance factor based on three standard deviations.

11. A system as defined in claim 1, wherein the at least one risk factor comprises:
at least one risk factor from the group consisting of Standard Deviation, Beta, and Up-Less-Down-Capture.

12. A system as defined in claim 11, wherein the ranking for each risk factor is evaluated using a normal distribution to rank the mutual funds in that risk factor based on three standard deviations.

13. A system as defined in claim 11, wherein each of Standard Deviation, Beta, and Up-Less-Down-Capture that is used in the at least one risk factor is weighted equally.

14. A system as defined in claim 1, wherein the at least one qualitative factor comprises:
at least one qualitative factor from the group consisting of Information Ratio, R-Squared, Alpha, Manager Tenure, and Net Expense Ratio.

15. A system as defined in claim 14, wherein the ranking for the qualitative factors Information Ratio, R-Squared, and Alpha are each evaluated using a normal distribution to rank the mutual funds in that qualitative factor based on three standard deviations.

16. A system as defined in claim 14, wherein the ranking for the qualitative factors Manager Tenure and Net Expense Ratio are each evaluated using a Chi-Squared analysis since they are bound by zero, which they cannot go below.

17. A system as defined in claim 14, wherein each of Standard Deviation, Beta, and Up-Less-Down-Capture that is used in the at least one qualitative factor is weighted equally.

18. A system as defined in claim 1 wherein the at least two different time periods comprise at least one longer term time period and at least one shorter term time period, wherein performance is respectively weighted less for shorter term time period than it is for the longer term time period.

19. A system as defined in claim 1, wherein the rating scoring system processor is configured to:
for each mutual fund to be rated, determine whether historical performance information for at least one of at least three different time periods exists, wherein the three time periods are a longer term time period, a shorter term time period, and a middle term time period;
wherein performance is respectively weighted less for middle term time period than it is for the longer term time period; and
wherein performance is respectively weighted less for shorter term time period than it is for the middle term time period.

20. A system as defined in claim 1, wherein the rating scoring system processor is configured to:
obtain a list of mutual funds selected by a client from a client portfolio information database that is coupled to the rating scoring system processor;
obtain historical performance information for each of the mutual funds contained in the client's list;
obtain the rating for each of the mutual funds contained in the client's list; and formatting and printing the historical performance information and the rating for each of the mutual funds contained in the client's list.

21. A system for generating relative ratings of mutual funds, comprising:
a non-transitory computer readable investment information database configured to store information, acquired from a computer server networked to the investment information database, including historical performance information for a large plurality of mutual funds of multiple different investment categories, the investment categories being stored in a rating category database;
a network server connected via a network to a commercial source of investment information, wherein the network server is configured to periodically download investment information from the source of investment information, and configured to store the investment information in the investment information database;

a data filter coupled to a rating scoring system processor, and configured to provide a desired subset of the investment information stored in the investment information database to the rating scoring system processor; and the rating scoring system processor coupled to the investment information database, and coupled to a rating weighting database and the rating category database, the rating scoring system processor configured to electronically receive requests for mutual fund rating information and to electronically transmit the mutual fund rating information, with the rating scoring system processor further configured to:

for each mutual fund to be rated, determine whether historical performance information for at least one of at least three different time periods exists;

for each mutual fund to be rated having historical performance information for at least one time period, determining, based upon the historical performance information, a relative ranking of the mutual fund to be rated with other mutual funds that are in the same investment category as the mutual fund to be rated for each of a plurality of factors;

wherein the plurality of factors includes a performance factor, a plurality of risk factors, and a plurality of qualitative factors; and wherein if the mutual fund to be rated has historical performance information for multiple time periods, a separate ranking is determined for each time period for each of the factors having historical performance information for multiple time periods;

for each of the plurality of factors for each mutual fund to be rated that has separate rankings for each of the multiple time periods, applying a time-based weighting, retrieved from the rating weighting database, to the separate rankings for such factors and combining the weighted separate rankings for each of such factors into a single ranking for each such factor;

for each mutual fund to be rated, applying a factor weighting, retrieved from the rating weighting database, to the rankings for each of the plurality of factors and combining the weighted plurality of factors into a single rating of the mutual fund being rated; and the network server configured to provide electronic access to the rankings and relative ratings of mutual funds via a network connection.

22. A system for generating relative ratings of mutual funds, comprising:

a non-transitory computer readable investment information database configured to store information including historical performance information for a large plurality of mutual funds;

a network server connected via a network to a commercial source of investment information, wherein the network server is configured to periodically download investment information from the source of investment information, and configured to store the investment information in the investment information database;

a data filter coupled to a rating scoring system processor, and configured to provide a desired subset of the investment information stored in the investment information database to the rating scoring system processor; and the a rating scoring system processor coupled to the investment information database, and coupled to a rating weighting database, the rating scoring system processor configured to electronically receive requests for mutual fund rating information and to electronically transmit the mutual fund rating information, with the rating scoring system processor further configured to:

for each mutual fund to be rated, determine whether historical performance information for at least one of at least two different time periods exists;

for each mutual fund to be rated having historical performance information for at least one time period, determining a relative ranking of the mutual fund to be rated with other mutual funds for each of a plurality of factors;

wherein if the mutual fund to be rated has historical performance information for multiple time periods, a separate ranking is determined for at least some of the plurality of factors for each time period;

for each of the plurality of factors for each mutual fund to be rated that has separate rankings for multiple time periods, applying a time-based weighting, retrieved from the rating weighting database, and combining the weighted separate rankings into a single ranking for each factor; and applying a factor weighting, retrieved from the rating weighting database, to the rankings for each of the plurality of factors and combining the weighted plurality of factors into a single rating of the mutual fund being rated.

23. A method of generating relative ratings of mutual funds, comprising:

importing statistical information, via an electronic network;

storing the information including historical performance information for a large plurality of mutual funds of at least two different investment categories in an investment information database, the investment categories being stored in a rating category database;

using a rating scoring processor to determine, for each mutual fund to be rated, whether historical performance information for at least one of at least two different time periods exists, the rating scoring processor coupled to a rating weighting database and the rating category database, the rating scoring system processor configured to electronically receive requests for mutual fund rating information and to electronically transmit the mutual fund rating information;

for each mutual fund to be rated having historical performance information for at least one time period, determining, based upon the historical performance information, a relative ranking of the mutual fund to be rated with other mutual funds that are in the same investment category as the mutual fund to be rated for each of a plurality of factors;

if the mutual fund to be rated has historical performance information for multiple time periods, determining a separate ranking for at least some of the plurality of factors for each of the multiple time periods;

for each of the plurality of factors for each mutual fund to be rated that has separate rankings for each of the multiple time periods, applying a time-based weighting, retrieved from the rating weighting database, to the separate rankings for such factors and combining the weighted separate rankings for each of such factors into a single ranking for each such factor;

for each mutual fund to be rated, applying a factor weighting, retrieved from the rating weighting database, to the rankings for each of the plurality of factors and combining the weighted plurality of factors into a single rating of the mutual fund being rated; and providing electronic access to a network server connected via a network to a commercial source of investment information including the rankings and relative ratings of mutual funds, wherein the network server is configured to periodically download investment information from the source of investment information, and configured to store the investment information in the investment information database; and wherein a data filter is coupled to the rating scoring system processor, and configured to provide a desired subset of the investment information stored in the investment information database to the rating scoring system processor.

24. A system as defined in claim 1, further comprising: a network server coupled to the rating scoring system processor, and configured to provide electronic access to the relative ratings of mutual funds via a network connection.

* * * * *